United States Patent [19]
Loidl et al.

[11] Patent Number: 5,137,068
[45] Date of Patent: Aug. 11, 1992

[54] RADIAL-PLY TIRE FOR TRUCKS WITH TREAD BLOCKS DIVIDED INTO TWO PARALLELOGRAM-SHAPED PARTS

[75] Inventors: Helmut Loidl, Sparbach; Josef Stelzer, Vienna, both of Austria

[73] Assignee: Semperit Reifen AG, Traiskirchen, Austria

[21] Appl. No.: 505,993

[22] Filed: Apr. 9, 1990

[30] Foreign Application Priority Data

Apr. 13, 1989 [AT] Austria .................................. 875/89

[51] Int. Cl.⁵ ............................................. B60C 11/11
[52] U.S. Cl. ............................... 152/209 R; D12/147
[58] Field of Search .......... 152/209 R, 209 D, 209 A, 152/DIG. 3; D12/136, 140, 146-148

[56] References Cited

U.S. PATENT DOCUMENTS

| | | | |
|---|---|---|---|
| D. 310,648 | 9/1990 | Armellin | D12/140 |
| D. 310,985 | 10/1990 | Covert et al. | D12/147 |
| D. 311,891 | 11/1990 | Covert et al. | D12/147 |
| 4,327,792 | 5/1982 | Landers | 152/209 R |
| 4,412,576 | 11/1983 | Nakajima | |
| 4,690,189 | 9/1987 | Bradisse et al. | 152/209 R |
| 4,702,292 | 10/1987 | Brayer | 152/209 R |
| 4,856,571 | 8/1989 | Collette et al. | 152/209 R |

FOREIGN PATENT DOCUMENTS

| | | |
|---|---|---|
| 0295195 | 12/1988 | European Pat. Off. |
| 8807996 | 10/1988 | Fed. Rep. of Germany |
| 95912 | 4/1989 | Japan .............................. 152/209 R |
| 2046188 | 11/1980 | United Kingdom |
| 2093777 | 9/1982 | United Kingdom |

OTHER PUBLICATIONS

European Patent Office Search Report.

*Primary Examiner*—Geoffrey L. Knable
*Attorney, Agent, or Firm*—Sandler, Greenblum & Bernstein

[57] ABSTRACT

The radial-ply tire for use on trucks and constructed according to the invention possesses a tread profile which comprises an equatorial line, a tread-profile width and a plurality of rows of blocks separated from one another by circumferential grooves. Each block comprises two substantially parallelogram-shaped blocks parts separated from each other by a fine cross slit substantially centrally extending through the respective block. Two of four block edges of each substantially parallelogram-shaped block part extend substantially parallel to the equatorial line of the tread profile. The other two block edges inclinedly extend relative to the equatorial line at angles which are not 90°, whereby all inclinedly extending block edges in a row of blocks form with the equatorial line at least substantially equal angles of inclination.

6 Claims, 2 Drawing Sheets

RADIAL-PLY TIRE FOR TRUCKS WITH TREAD BLOCKS DIVIDED INTO TWO PARALLELOGRAM-SHAPED PARTS

BACKGROUND OF THE INVENTION

The present invention broadly relates to vehicular pneumatic tires and pertains, more specifically, to a new and improved radial-ply tire for use on trucks, particularly for the driving axle or shaft.

Generally speaking, the radial-ply tire of the present development is of the type having a tread profile comprising an equatorial line, a tread-profile width and a plurality of rows of blocks distributed across the tread-profile width and separated from one another by circumferential grooves. The plurality of rows of blocks comprise a central row of blocks extending substantially along the equatorial line, two flanking rows of blocks located one at each side of the central row of blocks, and two lateral rows of blocks extending at respective shoulders of the tread profile. The individual blocks in each row of blocks are separated from each other by cross or transverse grooves having a straight centerline.

For modern radial-ply tires for use on cargo trucks, motor freight cars, lorries and the like, particularly tires for the driving axle or shaft, always more stringent requirements have to be met with respect to safety and economy, i.e. good wear properties. In particular, research and development of such tires must take into consideration the high engine or motor power or output of modern trucks and the commercialized requirement of high mileage of the tire. In this connection, the configuration or structure of the tread profile of such radial-ply tires is of particular importance. For the purpose of improving the mileage of a tire it is to some extent common practice to increasingly augment the depth of the tread profile. However, depending upon the configuration or pattern of the tread profile, this measure can work out unfavorably with respect to stability and handling performance.

Conventional tires for the driving axle or shaft of a truck often comprise a tread profile in which there are provided a plurality of rows of blocks extending in circumferential direction. The circumferential grooves separating these circumferential rows of blocks from one another are thereby structured in zigzagged manner, whereby the zigzag configuration can be at times very pronounced or marked. In direct connection with such configuring or patterning of the circumferential grooves, the individual blocks are configured such that the block edges extending in circumferential direction also comprise an angle-shaped configuration. Longitudinal or straight-course guidance and lateral stability of the vehicle, particularly because of the high engine or motor power and the increased depth of the tread profile, are particularly important requirements. In vehicles provided with driving-axle tires structured as described hereinbefore, the driving axle or shaft tends to laterally drift or deviate from course because of inadequate longitudinal or straight-course guidance. A further problem which can arise in connection with tires having a tread profile with circumferential rows of blocks and showing advanced abrasive wear, is the formation of a so-called sawtooth profile. The leading block edges, i.e. the block edges of the tread profile which, during rolling motion of the tire first come into contact with the ground, are less subject to wear than the second or trailing block edges. The series-arranged blocks in a circumferential row of blocks thus form a substantially sawtooth profile. Furthermore, known driving-axle tires for trucks are worthy of improvement with regard to traction behavior, handling performance, braking and wet-grip properties, particularly on wet or snow covered roadways.

SUMMARY OF THE INVENTION

Therefore, with the foregoing in mind, it is a primary object of the present invention to provide a new and improved construction of radial-ply tire, particularly a truck tire suitable for truck driving axles and which tire is not afflicted with the aforementioned drawbacks and shortcomings of the prior art constructions.

Another and more specific object of the present invention aims at providing a new and improved radial-ply tire comprising a tread profile configured and structured to effectively improve longitudinal or straight-course guidance and to enhance traction.

A further important object of the present invention is directed to a new and improved vehicular pneumatic radial-ply tire of the initially mentioned type and provided with a tread profile configuration or structure which notably reduces sawtooth formation during abrasive wear.

Now to implement these and still further objects of the present invention which will become more readily apparent as the description proceeds, the radial-ply tire constructed according to the invention is manifested, among other things, by the features that each block comprises two substantially parallelogram-shaped block parts which are separated from one another by a fine cross or transverse slit which extends essentially centrally through the block, whereby the transverse extent of the substantially parallelogram-shaped block parts is larger than the circumferential extent thereof. Each substantially parallelogram-shaped block part comprises four block edges, two of which extend substantially parallel to the equatorial line of the tread profile and the other two block edges inclinedly extend relative to the equatorial line at angles which are not 90°, whereby all inclinedly extending block edges in a circumferential row of blocks form with the equatorial line at least substantially equal angles of inclination.

The inventive features of the radial-ply tire provide a tread profile in which the block edges oriented in circumferential direction and extending substantially parallel to the equatorial line effectively ensure very good longitudinal or straight-course guidance and lateral stability, thus substantially precluding lateral drifting of the driving axle or shaft.

The inventive measure of subdividing the blocks in substantially parallelogram-shaped block parts provides a plurality of edges which, during rolling motion of the tire, enhance road grip in circumferential direction, thus improving traction properties, especially on wet or snowy or snow-covered roads. This feature also favorably affects the tire mileage, because irregular or uneven wear, for instance by sawtooth formation, is substantially precluded.

For regular or uniform wear in the shoulder areas of the tread profile, it is advantageous when the angle of the inclinedly extending block edges in the two lateral rows of blocks is selected to be smaller by at least 2°, preferably by approximately 5°, than the angle of the inclinedly extending block edges in the respective neighboring flanking rows of blocks.

Furthermore, to support or augment longitudinal or straight-course guidance it is advantageous when the central row of blocks is separated from the neighboring two flanking rows of blocks by respective rectilinearly extending circumferential grooves which have a groove width of maximum 5 mm, preferably approximately 3 mm.

Stability and uniform or regular wear in the central area or region of the tread profile are beneficially affected when the blocks in the central row of blocks are separated from one another by cross or transverse grooves having a groove width of maximum 5 mm, but preferably approximately 3 mm.

In a preferred embodiment of the radial-ply tire constructed according to the invention, each block comprises two substantially parallelogram-shaped block parts which are essentially equal in size.

In a further exemplary embodiment of the radial-ply tire constructed according to the invention, the blocks in the two lateral rows of blocks and the blocks in the neighboring two flanking rows of blocks each possess a substantially parallelogram-shaped block part which, in the transverse direction, is longer than the other substantially parallelogram-shaped block part by 5% to 25%, preferably by approximately 15%, whereby the end face of a longer block part of one row of blocks confronts in each case the end face of a shorter block part of the neighboring or associated row of blocks. In this manner, there results a somewhat zigzag-shaped formation of the wide circumferential grooves with the sections offset against one another in the transverse direction. Such block part and groove configuration provides a substantially regular or uniform wear pattern on the tread profile. In this connection, it is also advantageous when the corner areas of the blocks and, therefore, of the substantially parallelogram-shaped block parts are beveled or rounded out.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have been generally used the same reference characters to denote the same or analogous components and wherein.

DETAILED DESCRIPTION OF THE PREFERRED EMBODIMENTS

Describing now the drawings, it is to be understood that to simplify the showing thereof, only enough of the construction of tread profile for a radial-ply tire has been illustrated therein as is needed to enable one skilled in the art to readily understand the underlying principles and concepts of this invention.

Figure 2:
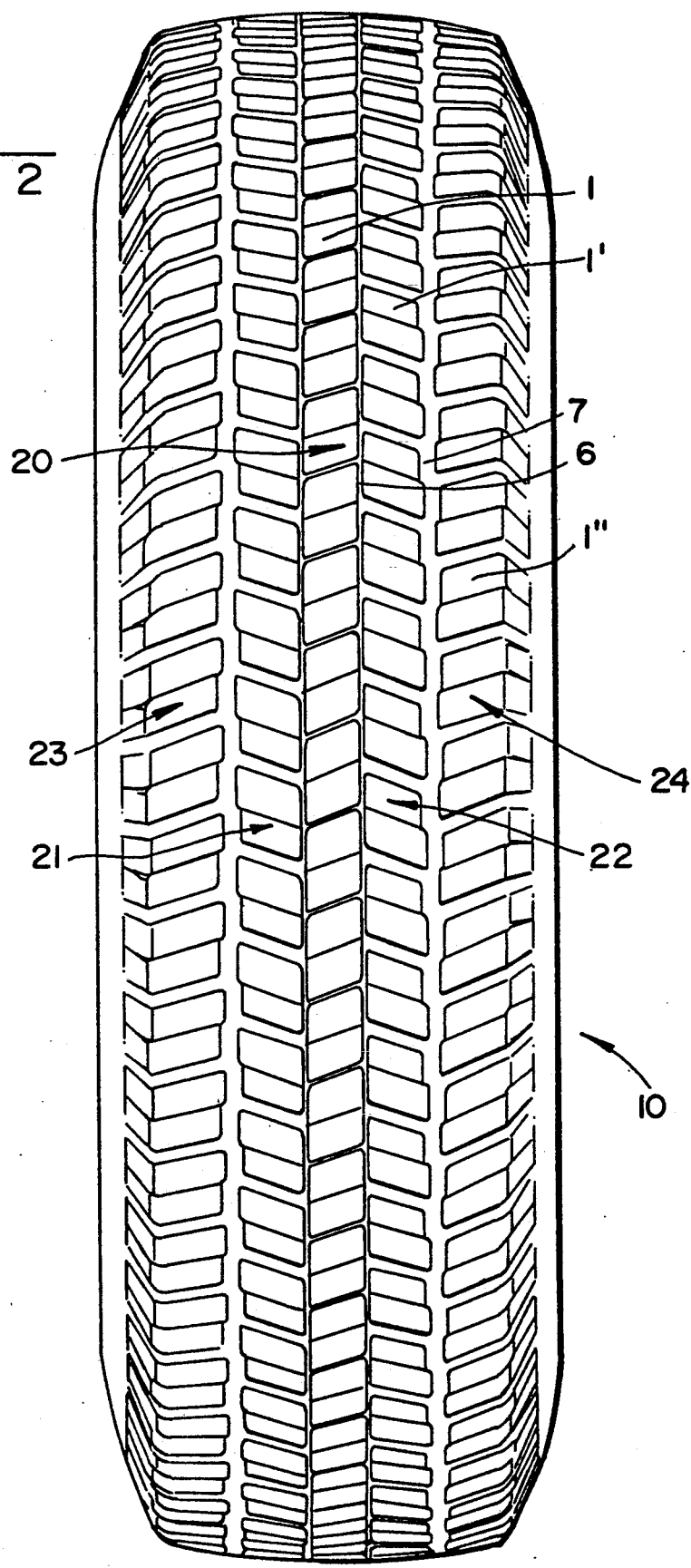
FIG. 2 shows a front view of the radial-ply tire comprising the tread profile depicted in FIG. 1.

Turning attention now first to FIG. 2 of the drawings, a vehicular pneumatic tire illustrated therein by way of example and not limitation will be seen to represent a radial or radial-ply tire 10 which is particularly suitable as a tire for the driving axle or shaft of cargo trucks, motor freight cars, cargo carriers or lorries, hereinafter generally referred to as trucks.

Attention hereinafter is specifically directed to FIG. 1 of the drawings in which a partial development of a tread profile 15 across a tread-profile width B is shown, such tread-profile width B being the width of the radial-ply tire 10 in the ground-contacting area at a rated pressure and a rated load. The tread profile 15 comprises five substantially circumferentially extending rows of blocks 20 through 24 separated from one another by circumferential grooves 6 and 7. The five rows of blocks 20 through 24 comprise respective blocks 1, 1' and 1" series-arranged in circumferential direction of the tread profile 15.

Each of the blocks 1, 1' and 1", when viewed from above in horizontal projection, is configured substantially in the form of a parallelogram. Furthermore, the blocks 1, 1' and 1" each are subdivided by respective fine cross or transverse slits 2, 2' and 2" into two substantially parallelogram-shaped block parts 1a and 1b, 1a' and 1b', and 1a" and 1b", the fine cross or transverse slits extending in the transverse direction relative to the circumferential direction and essentially centrally subdividing the blocks 1, 1' and 1". Two of four lateral block edges of the substantially parallelogram-shaped block parts 1a and 1b, 1a' and 1b', and 1a" and 1b" extend substantially parallel to an equatorial line A—A of the radial-ply tire 10, while the other two lateral block edges form with the equatorial line A—A angles $\alpha$, $\alpha'$ and $\beta$ which are not or differ from 90° and will be described in greater detail hereinafter.

By subdividing the tread profile 15 into five rows of blocks 20 through 24, one row of blocks 20 extends along the equatorial line A—A and the individual blocks 1 of this central row of blocks 20 are separated from one another by rectilinearly configured cross or transverse grooves 3 which have a maximum groove width of 5 mm, preferably about 3 mm. The fine cross or transverse slits 2 and the block edges defining the cross or transverse grooves 3 extend, as a result of the central subdivision of the individual blocks 1, substantially parallel to one another and are inclined relative to the equatorial line A—A at an angle $\alpha$ selected in a range between 50° and 80°. Preferably, this angle $\alpha$ is between 65° and 75°, particularly approximately 70°. The individual blocks 1 of this central row of blocks 20 are preferably structured to be longer in circumferential direction than in transverse direction.

On each side of the central row of blocks 20 extending substantially along the equatorial line A—A there are provided in each half of the tread profile 15 respective flanking rows of blocks 21 and 22 which are separated each from the central row of blocks 20 by a relatively narrow circumferential groove 6 structured as a straight or rectilinear groove. The two relatively narrow circumferential grooves 6 possess a maximum groove width of 5 mm, but a groove width of approximately 3 mm is preferred. The individual blocks 1' of these two flanking rows of blocks 21 and 22 are separated from each other by rectilinearly extending cross or transverse grooves 4 which are configured to be substantially wider than the cross or transverse grooves 3 in the central row of blocks 20. The width of the cross or transverse grooves 4 is maximum 12 mm, preferably about 10 mm.

By virtue of the parallelogram shape of the block parts 1a' and 1b', a substantially parallel arrangement of the fine cross or transverse slits 2' and the block edges defining the cross or transverse grooves 4 is also possible in these two flanking rows of blocks 21 and 22. The fine cross or transverse slits 2' of the block edges limiting the cross or transverse grooves 4 are inclined at an angle α' relative to the equatorial line A—A and, accordingly, oriented in an opposite direction with respect to the fine cross or transverse slit 2 and the block edges limiting the cross or transverse grooves 3. The angle α' is selected in an angular range which corresponds with the values specified for the angle α. Preferably, the tread profile 15 is configured such that the angles α and α' are equal. However, it should be mentioned that the angles α and α' are not necessarily equal and that, for example, the angle α can be selected to be smaller than the angle α'.

Two lateral rows of blocks 23 and 24 located in shoulder areas of the tread profile 15 are separated each from the neighboring two flanking rows of blocks 21 and 22 by a wide circumferential groove 7. The width of these two circumferential grooves 7 are approximately 12 mm in the tread of a new tire. The blocks 1" are likewise separated from one another by rectilinearly extending cross or transverse grooves 5 which possess substantially the same groove width as the cross or transverse grooves 4. The fine cross or transverse slits 2" and the block edges limiting the cross or transverse grooves 5 are also inclined relative to the equatorial line A—A, whereby in this case the inclination is oriented essentially in the same direction with respect to the inclination of the individual blocks 1 in the central row of blocks 20. The respective angle of inclination β is selected in a range between 45° and 75°, particularly between 60° and 70° and preferably approximately 65°. However, it is thereby necessary that this angle of inclination β is selected to be at least 2° smaller than the angle α'.

The wide circumferential grooves 7 comprise in circumferential direction sections which are somewhat offset relative to one another. As is apparent from the right half of the tread profile 15 depicted in FIG. 1, the individual blocks 1' and 1" of the rows of blocks 22 and 24 separated from one another by the wide circumferential groove 7 comprise respective substantially parallelogram-shaped block parts 1b' and 1b" which, in the transverse direction relative to the equatorial line A—A, are structured to be longer than the respective other substantially parallelogram-shaped block parts 1a' and 1a" by 5% to 25%, preferably approximately 15%. The end faces of the longer substantially parallelogram-shaped block parts 1b' and 1b" in respective rows of blocks 22 and 24 confront in each case respective end faces of shorter substantially parallelogram-shaped block parts 1a' and 1a". In the other or left half of the tread profile 15 depicted in FIG. 1, the other or, as illustrated, the upper substantially parallelogram-shaped block parts of the individual blocks 1' and 1" in respective rows of blocks 21 and 23 are structured to be longer.

Figure 1:
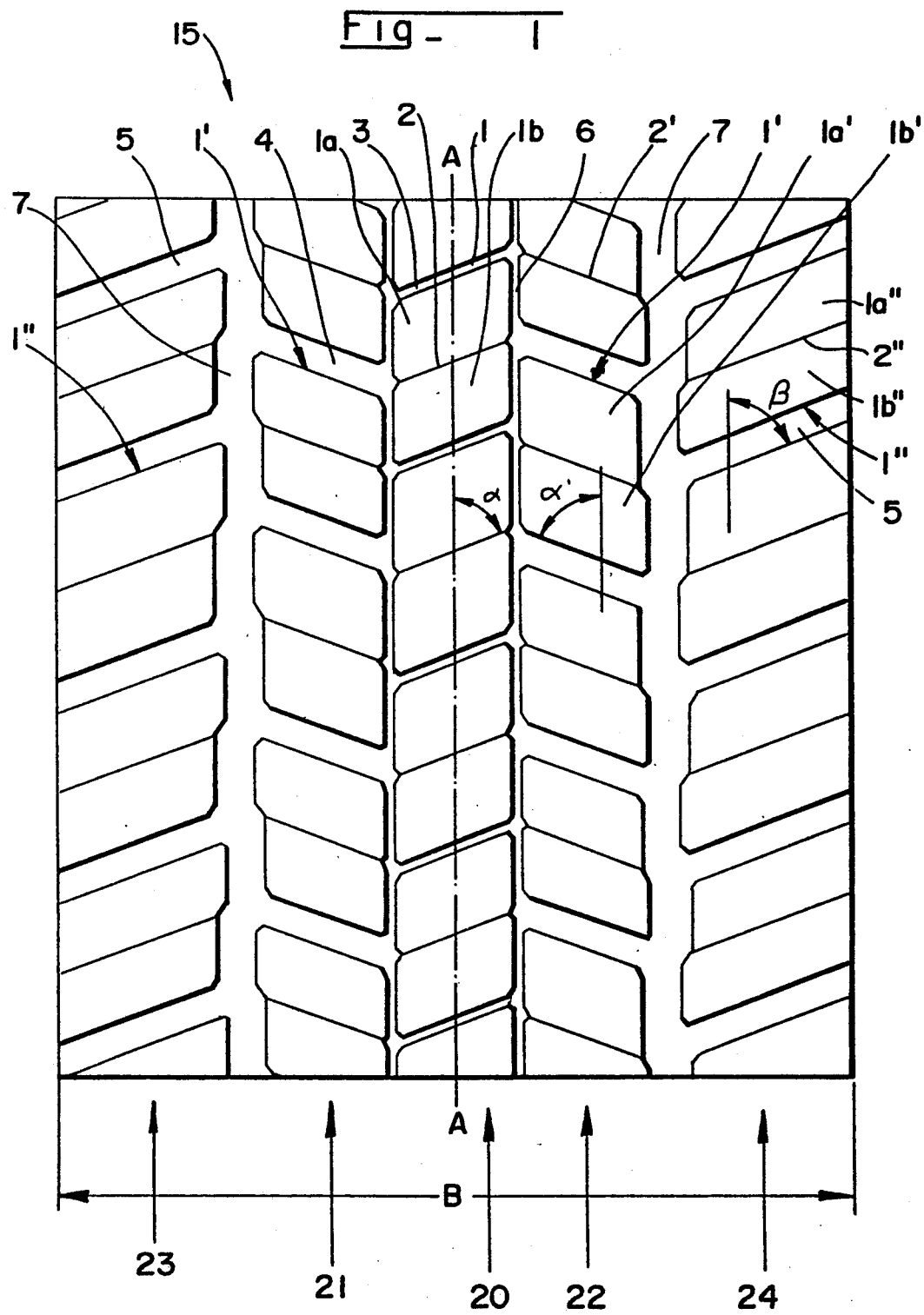
FIG. 1 schematically shows a plan view of a partial development of a tread profile of an exemplary embodiment of the inventive radial-ply tire.

In order to regularize the wear of the tread profile 15, it is advantageous, as can be seen in FIG. 1, that the corner areas of the individual blocks 1, 1' and 1" and, accordingly, of the parallelogram-shaped block parts 1a and 1b, 1a' and 1b', and 1a" and 1b" are structured to be beveled or rounded off.

Furthermore, reference is made to the possibility of varying the circumferential lengths of the individual blocks 1, 1' and 1" in the five rows of blocks 20 through 24 across the circumference of the tread profile 15. However, this technique is generally known for minimizing or favorably influencing the noise produced by the rolling motion of the tire 10. In a further not particularly illustrated embodiment of the radial-ply tire 10 constructed according to the invention, the wide circumferential grooves 7 can be configured as straight grooves, whereby the block parts separated by these wide circumferential grooves 7 possess the same transverse extent.

In the exemplary embodiment depicted in FIG. 1, the arrangement of the individual blocks 1, 1' and 1" show that the blocks of neighboring or adjacent rows of blocks are offset relative to one another by about a block part length as viewed in circumferential direction. However, it is also possible not to provide such arrangement at least in the central row of blocks 20 and in the flanking rows of blocks 21 and 22, so that the cross or transverse grooves 4 and the narrow cross or transverse grooves 3 form substantially throughpassing channels in the transverse direction.

While there are shown and described present preferred embodiments of the invention, it is to be distinctly understood that the invention is not limited thereto, but may be otherwise variously embodied and practiced within the scope of the following claims.
ACCORDINGLY,

What we claim is:

1. A radial ply tire for use on trucks, particularly for the driving axle, comprising:
   a tread profile having a circumferential direction and a tread-profile width;
   a plurality of rows of blocks distributed across said tread-profile width;
   circumferential grooves separating said plurality of rows of blocks from one another;
   said tread profile defining an equatorial line and two shoulder areas;
   said plurality of rows of blocks comprising a central row of blocks extending substantially along said equatorial line, two flanking rows of blocks located one at each side of said central row of blocks, and two lateral rows of blocks located one at each of said two shoulder areas;
   cross grooves separating individual blocks from one another in each row of blocks of said plurality of rows of blocks;
   said cross grooves having a straights center-line;
   fine cross slits subdividing each of said individual blocks in each row of blocks into two substantially parallelogram-shaped block parts;
   said fine cross slits substantially centrally extending though respective individual blocks;
   said two substantially parallelogram-shaped block parts of each of said individual blocks in each row of blocks having a transverse extent and a circumferential extent;
   said transverse extent of said substantially parallelogram-shaped block parts being larger than said circumferential extent thereof;
   said substantially parallelogram-shaped block parts each having four block edges;
   two of said four block edges of each substantially parallelogram-shaped block part extending substantially parallel to said equatorial line of said tread profile;
   the other two of said four block edges of each substantially parallelogram-shaped block part inclinedly extending relative to said equatorial line at angles which are different from 90°; and all inclinedly extending block edges in a row of blocks of forming with said equatorial line substantially equal angles of inclination which are different from 90°;

wherein:

said angle formed by said inclinedly extending block edges of substantially parallelogram-shaped block parts in said central row of blocks with the circumferential direction and said angle formed by said inclinedly extending block edges of substantially parallelogram-shaped block parts in said two flanking rows of blocks with the circumferential direction constitute angles between 50° and 80°;

said inclinedly extending block edges of substantially parallelogram-shaped block parts in said two flanking rows of blocks being inclined in an opposite direction with respect to said direction of angle of inclination of said inclinedly extending block edges of substantially parallelogram-shaped block parts in said central row of blocks;

said angles formed by said inclinedly extending block edges of substantially parallelogram-shaped block parts in said two lateral rows of blocks with the circumferential direction constitute angles between 45° and 75°;

said inclinedly extending block edges of substantially parallelogram-shaped block parts in said two lateral rows of blocks being inclined in the same direction with respect to said inclinedly extending block edges of substantially parallelogram-shaped block parts in said central row of blocks;

said angle formed by said inclinedly extending block edges of substantially parallelogram-shaped block parts in said two lateral rows of blocks with the circumferential direction is selected to be at least 2° smaller than said angle formed by said inclinedly extending block edges of substantially parallelogram-shaped block parts in said two flanking rows of blocks with the circumferential direction;

said circumferential grooves constitute two rectilinearly extending circumferential grooves separating said central row of blocks from said two flanking rows of blocks;

said two rectilinearly extending circumferential grooves having a groove width of maximum 5 mm;

said cross grooves separating individual blocks from each other in said central row of blocks comprise a groove width of maximum 5 mm;

said circumferential grooves constitute two wide circumferential grooves separating said two lateral rows of blocks from said two flanking rows of blocks;

said two wide circumferential grooves each comprise a groove width of up to 12 mm; and said cross grooves separating individual blocks from one another in said two lateral rows of blocks and in said two flanking rows of blocks comprise a groove width of up to 10 mm;

said radial ply tire further including:

an axis of rotation defining a transverse direction;

said substantially parallelogram-shaped block parts of said individual blocks in said two lateral rows of blocks and in said two flanking rows of blocks constitute one parallelogram-shaped block part configured to be 5% to 25% longer in said transverse direction than the other parallelogram-shaped block part in the respective individual block;

said one substantially parallelogram-shaped block part and said other substantially parallelogram-shaped block part constituting a longer block part and a shorter block part, respectively;

said longer block part and said shorter block part each having an end face;

said end face of a longer block part of an individual block in one of said two lateral rows of blocks confronting said end face of a shorter block part of an individual block in the neighboring one of said two flanking rows of blocks; and said end face of a shorter block part of an individual block in one of said two lateral rows of blocks confronting said end face of a longer block part of an individual block in the neighboring one of said two flanking rows of blocks.

2. The radial-ply tire as defined in claim 1, wherein:

said one parallelogram-shaped block part is configured to be approximately 15% longer is said transverse direction than said other parallelogram-shaped block part.

3. The radial-ply tire as defined in claim 1, wherein:

said blocks comprise corner areas and said corner areas being selectively either beveled or rounded off.

4. The radial-ply tire as defined in claim 1, wherein:

said substantially parallelogram-shaped block parts comprise corner areas; and said corner areas being selectively either beveled or rounded off.

5. The radial-ply tire as defined in claim 4, wherein:

said fine cross slits subdividing each of said individual blocks into two substantially parallelogram-shaped block parts have a slit width of maximum 1 mm.

6. The radial-ply tire as defined in claim 5, wherein:

said circumferential grooves and said cross grooves have a predetermined depth at said tread profile; and said fine cross slits having a depth of at least 75% of said predetermined depth at said tread profile.

* * * * *